United States Patent

[11] 3,610,173

| [72] | Inventors | John W. McIlwraith<br>121 Hazelcroft Ave.;<br>David W. Case, 40 Sunset Drive; Roger C. Eddy, 1511 Jackson Ave, all of New Castle, Pa. 16101 |
|---|---|---|
| [21] | Appl. No. | 813,552 |
| [22] | Filed | Apr. 4, 1969 |
| [45] | Patented | Oct. 5, 1971 |

[54] PLASTIC PALLET
10 Claims, 3 Drawing Figs.

[52] U.S. Cl. .................................................. 108/57, 108/51
[51] Int. Cl. .................................................. B65d 19/38
[50] Field of Search .......................................... 108/51–58

[56] References Cited
UNITED STATES PATENTS

| 2,615,661 | 10/1952 | Cushman | 108/52 |
| 2,918,241 | 12/1959 | Maher | 108/57 |
| 2,930,560 | 3/1960 | Carnwath et al. | 108/56 |
| 3,106,174 | 10/1963 | Newton | 108/51 |
| 3,113,532 | 12/1963 | White | 108/56 |
| 3,123,020 | 3/1964 | Voissem | 108/51 |
| 3,331,336 | 7/1967 | Seholde et al. | 108/57 |
| 3,393,647 | 7/1968 | Howell | 108/52 |
| 3,404,642 | 10/1968 | Belcher et al. | 108/58 |
| 3,407,758 | 10/1968 | Simkins | 108/51 |
| 3,467,032 | 9/1969 | Rowlands et al. | 108/58 |

*Primary Examiner*—Bobby R. Gay
*Assistant Examiner*—Glenn O. Finch
*Attorney*—Brown, Murray, Flick & Peckham

ABSTRACT: A plastic load-bearing pallet is disclosed. The pallet is formed of individual, thermoplastic top and bottom deck members which are releasably assembled together in spaced apart relation by a plurality of spaced column members arranged so as to allow for four way entry of forklift apparatus between the top and bottom deck members.

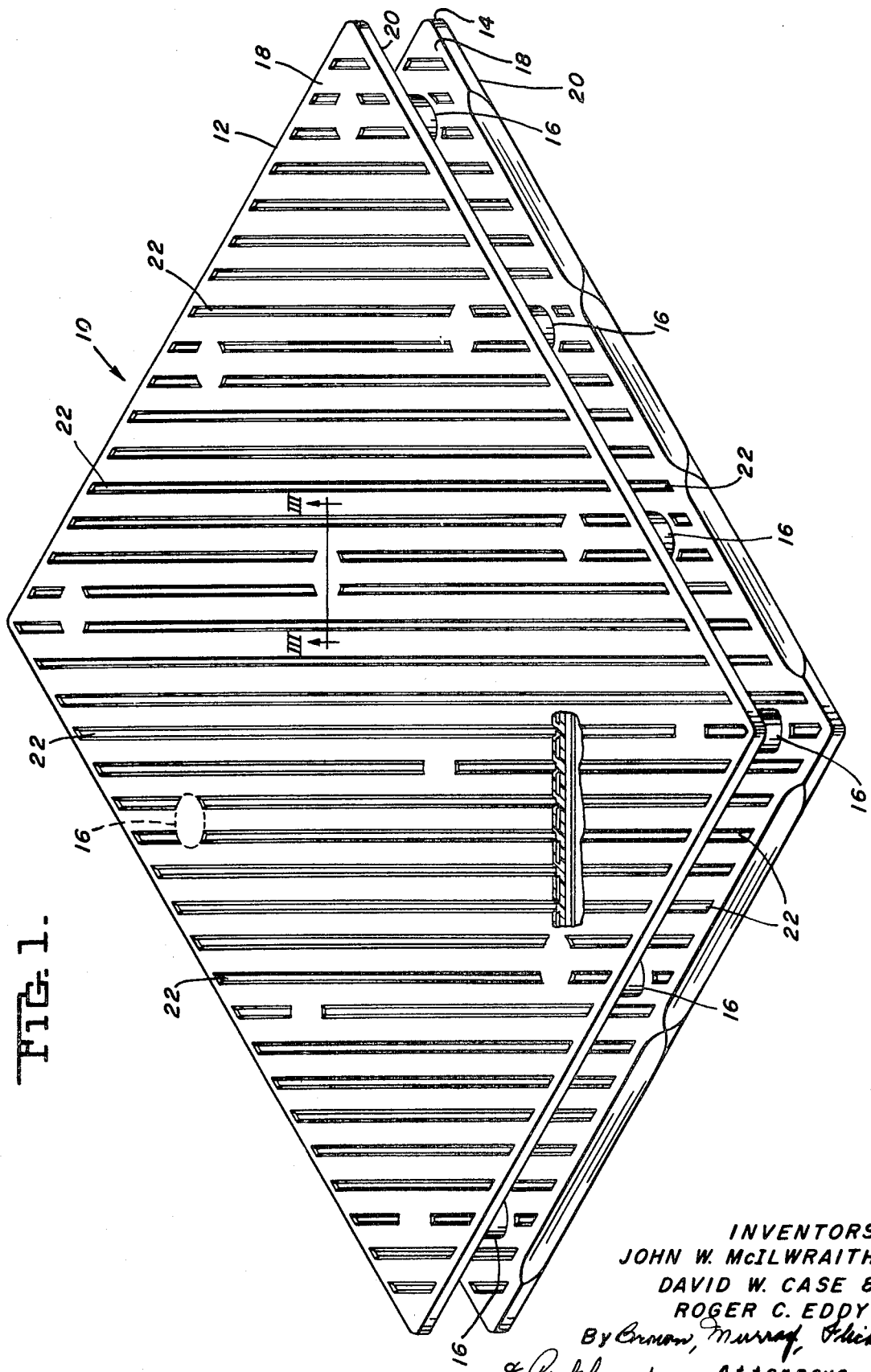

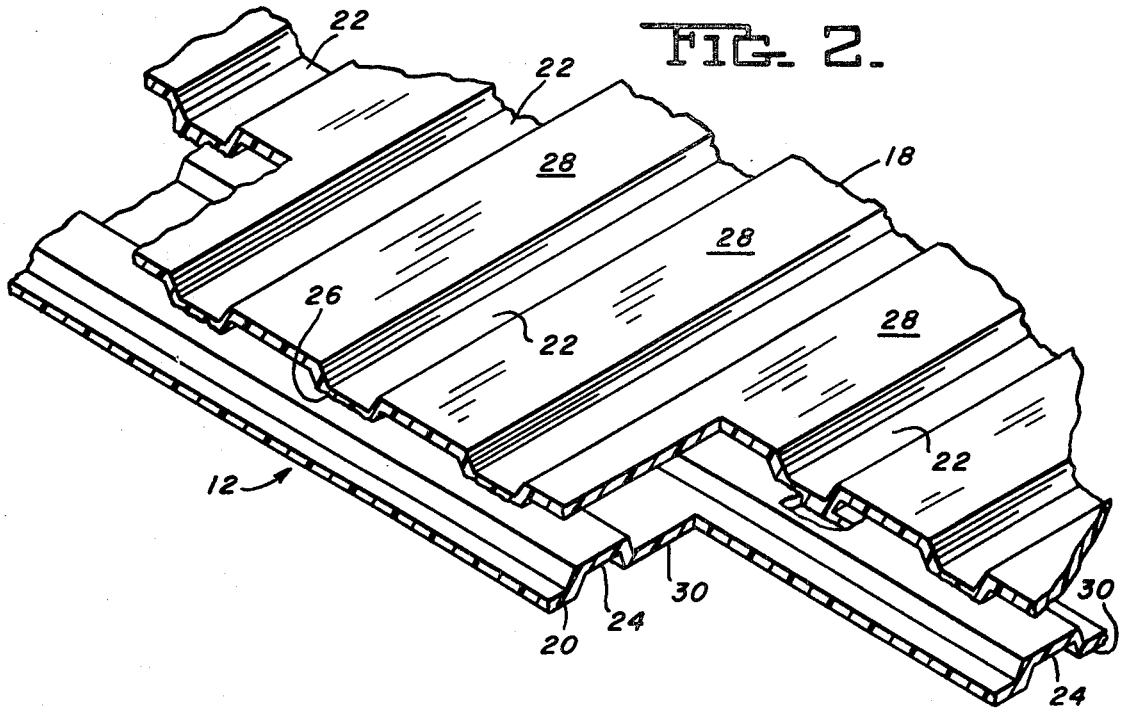
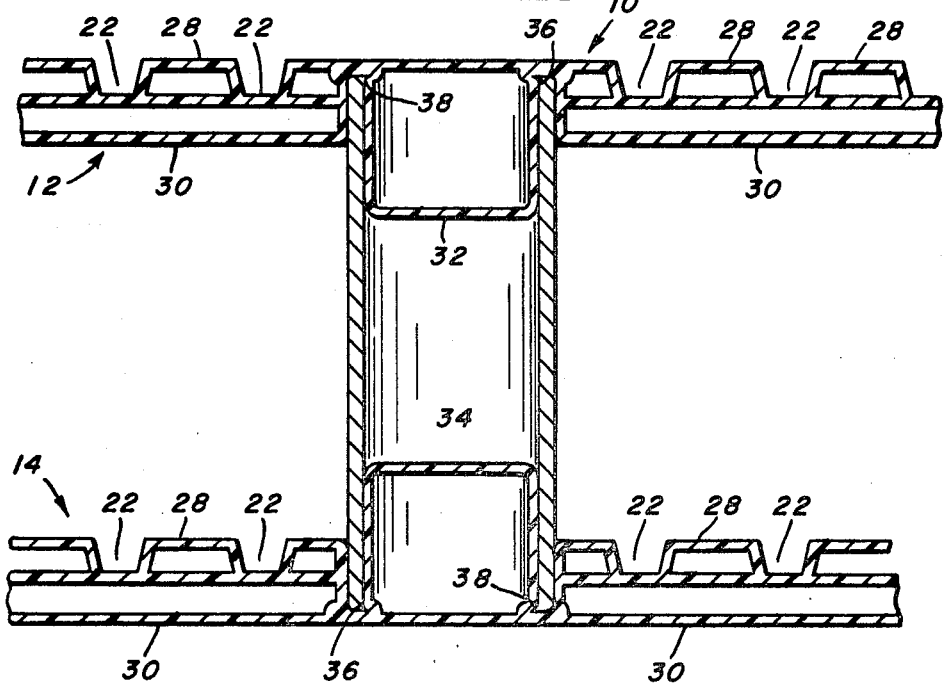

3,610,173

PLASTIC PALLET

BACKGROUND OF THE INVENTION

1. Field of the Invention

This invention relates to plastic pallets, and more particularly to load-bearing pallets formed to individual, molded, thermoplastic top and bottom deck members.

2. Description of the Prior Art

It may be explained that pallets formed of wood and metal are well known. Such pallets have the disadvantage of being heavy and cumbersome. Additionally, such pallets are expensive to manufacture. As a result of these and other factors, attempts have been made to develop lightweight plastic pallets that are relatively economical to manufacture and which are of sufficient strength so as to be capable of supporting and handling the large loads normally associated with wood and metal pallets. Thus far, such attempts have been only partially satisfactory in providing an adequate plastic pallet suited to the needs of the material-handling industry.

SUMMARY OF THE INVENTION

Briefly, the present invention provides in a plastic pallet construction, top and bottom deck members, each comprising a thermoplastic unitary structure defining an enclosure having upper and lower generally parallel surfaces. Each of the surfaces of each deck have a plurality of recessed channels and the bottom portions of the channels in one surface are welded to the bottom portions of the channels in the other surface at spaced points along their lengths. Preferably, the channels in one of the surfaces are perpendicular to those in the other surface. The top and bottom decks are separated by and preferably, releasably interlocked by a plurality of spaced columns.

In accordance with the broad principles of the invention, it is an object of the invention to provide a plastic pallet superior to any heretofore proposed and one which is exceptionally strong and reversible in that either side may be up to support the load.

Another object of the invention is to provide a plastic pallet construction having top and bottom decks wherein when either of the decks is damaged the pallet can be easily disassembled and the damaged deck replaced.

Yet another object of the invention is to provide a plastic pallet construction having a top and bottom deck spaced apart vertically by and releasably interlocked with a plurality of column members, which column members are arranged so as to allow for four way entry of forklift apparatus between the top and bottom decks.

Other objects and advantages of this invention will become apparent from the following description taken in connection with the accompanying drawings.

BRIEF DESCRIPTION OF THE DRAWINGS

FIG. 1 is a perspective view of a pallet embodying the features of the present invention with a part of the top deck broken away to show the cross-sectional configuration thereof;

FIG. 2 is a fragmentary perspective view of one of the decks shown in FIG. 1 illustrating the construction of the decks; and FIG. 3 is a sectional view taken along the line III—III in FIG. 1 illustrating the cross-sectional configuration of one of the columns and the cuplike portions of the upper and lower decks by which the decks are separated and releasably interlocked.

DESCRIPTION OF THE PREFERRED EMBODIMENT

As is shown in FIGS. 1–3, a rectangular pallet 10 in accordance with the invention, is formed of top and bottom deck members 12 and 14, respectively. Such a pallet may be of any convenient size, for example 40×48×5½ inches. The top and bottom deck members are vertically spaced apart and interlocked by a plurality of vertically oriented hollow tubular column members 16. The column members 16 are spaced apart and arranged as shown so as to allow four-way entry of forklift apparatus between the top and bottom decks.

Each of the decks 12, 14 comprises a formed thermoplastic unitary structure defining a unitary enclosure having an upper surface 18 and a lower surface 20 and in which all parts of the enclosure communicate with other parts of the enclosure. Any suitable thermoplastic material, such as high-density polyethylene, may be used in fabricating the deck members. Each of the upper and lower surfaces of each deck member have a plurality of parallel recessed channels which extend diagonally to the side edges of the deck member. The channels in the surfaces of each deck member are best seen in FIG. 2 and the channels in the upper surface of each deck are designated by the reference number 22 and those channels in the lower surface of each deck by the reference number 24.

The channels 22 in the upper surface 18 are perpendicular to the channels 24 in the lower surface 20. During the molding operation, the bottom portions 26 of the channels 22 are welded to the bottom portions of the channels 24 at the central plane of the deck members and at spaced points along their lengths.

Thus, each of the deck members has great strength because the portions 28 between the channel 22 and the portions 30 between the channels 24, in effect, form a plurality of welded cross beams in each deck member. Also, it can be seen that each of the deck members is relatively light due to the fact that they are each substantially hollow. If desired, however, a polyurethane foaming agent can be introduced into the voids between upper and lower surfaces of each deck, which when cured, would increase the strength of the decks without adding any appreciable weight thereto.

Referring now more particularly to FIG. 3, in order to releasably interlock the top and bottom deck members which form the pallet, a plurality of cuplike portions 32 are provided on the top deck member 12 and similar cuplike portions 34 are provided on the bottom deck member 14. When the two deck members are assembled the cuplike portions 32, 34 are located on the facing surfaces of the top and bottom deck members with the cuplike portions 32 on the top deck member being axially aligned and in registry with the cuplike portions 34 on the bottom deck member 14. The cuplike portions 32, 34 are integrally formed with the deck members in the molding operation and each have an annular undercut portion 36 formed during the molding operation.

Each of the column members 16 are preferably roll cut from elongated, tubular metal stock in order that the opposite end portions of each of them have inwardly directed edge portions 38. These edge portions 38 are received in the undercut portions of the cuplike portions on the top and bottom deck members and thereby secure and interlock the top and bottom deck members. If desired, however, the column members 16 may be formed of suitable high-strength plastic and be welded to the cuplike portions by either a suitable solvent, the use of ultrasonic welding or other well known techniques.

It should be noted, that each of the column members 16, at their respective terminal end portions, are in contact with solid material and not with hollow portions of the deck members. This feature, of course, gives high compressive strength to the pallet. It should also be noted that the area of contact of the column members 16 with the solid portions of the deck members has been illustrated as being relatively small, however, this area can of course be increased. The spacing between the channels and the cuplike portions in the region where a column is to be located can be increased and the wall thickness of the column members 16 can be increased. By increasing these dimensions, the compressive strength of the pallet will also be increased.

If desired, suitable openings may be provided in the lower deck member of the pallet to adapt the pallet for use with hand trucks of the type with fork portions having wheels which are inserted between the decks, received in the openings and thereafter lowered into contact with the ground while simultaneously raising the pallet from the ground.

By reason of their construction, either side of the pallet may be up to support a load and if either the top or bottom deck member is damaged or must be replaced for any reason, it can be easily removed and replaced. Also, the column members 16 can be cut to any desired length to provide more or less space between the deck members as desired to suit a particular need. Furthermore, the simple manner in which the top and deck members are assembled together permits on site assembly thereof, thus, allowing the individual decks to be stored or shipped in stacked relation resulting in lower storing and shipping costs.

It will be obvious to those having ordinary skill in the art that various changes may be made in the details of the above described embodiment of the present invention without departing from the spirit of the invention. Therefore, the scope of the invention should be determined by the following claims.

We claim as our invention:

1. In a plastic pallet construction, top and bottom decks separated by a plurality of spaced columns, each of said decks comprising a unitary structure having upper and lower generally parallel surfaces, said upper and lower surfaces defining a unitary enclosure therebetween in which all parts of the enclosure communicate with other parts of enclosure, and parallel recessed channels in both of said surfaces, the bottom portions of the channels in one surface being welded to the bottom portions of the channels in the other surface at spaced points along their lengths.

2. In a pallet construction, top and bottom decks separated by and interlocked by a plurality of spaced columns, each of said decks comprising a unitary structure having upper and lower generally parallel surfaces, said upper and lower surfaces defining a unitary enclosure therebetween in which all parts of the enclosure communicate with other parts of the enclosure, and parallel recessed channels in both of said surfaces, the channels in one surface being perpendicular to those in the other surface with the bottom portions of the channels in one surface being welded to the bottom portions of the channels in the other surface at spaced points along their lengths.

3. In a pallet construction as defined in claim 2 wherein said decks are rectangular in configuration and said channels extend diagonally to the side edges of the decks.

4. In a pallet construction as defined in claim 2 including a plurality of cuplike portions on said top deck and on said bottom deck, said cuplike portions being located on the facing surfaces of said top and bottom decks with the cuplike portions on the top deck being axially aligned and in registry with the cuplike portions on the bottom deck, each of said spaced columns comprising a tubular member having opposite end portions releasably secured to said respective axially aligned cuplike portions on said top and bottom decks respectively thereby releasably interlocking said top and bottom decks.

5. In a pallet construction as defined in claim 4 wherein each of said cuplike portions have an undercut portion and said opposite end portions of said tubular members have edge portions arranged to be received in said undercut portions.

6. In a pallet construction as defined in claim 5 wherein said cuplike portions and said tubular members are arranged so as to allow four way entry of fork lift apparatus between said top and bottom decks.

7. A load-bearing pallet comprising
a. vertically spaced apart top and bottom deck members, said deck members each comprising a blow molded, thermoplastic unitary structure defining an enclosure having upper and lower generally parallel surfaces, each of said surfaces having a plurality of parallel recessed channels with the channels in one of said surfaces being perpendicular to those in the other surface and with the bottom portions of the channels in one surface being welded to the bottom portions of the channels in the other surface at a central plane and at spaced points along their lengths,
b. a plurality of cuplike portions on said top deck member and on said bottom deck member, said cuplike portions being located on the facing surfaces of said top and bottom deck members with the cuplike portions on the top deck member being axially aligned and in registry with the cuplike portions on the bottom deck member, and
c. a plurality of vertically oriented hollow tubular column members, each of said column members having opposite end portions secured to said respective axially aligned cuplike portions on said top and bottom deck members respectively.

8. A load-bearing pallet as defined in claim 7 wherein each of said deck members are rectangular in configuration and said channels extend diagonally to the side edges of said deck members and wherein each of said cuplike portions have an undercut portion and said opposite end portions of said tubular column members have edge portions arranged to be received in said undercut portions.

9. A load-bearing pallet as defined in claim 8 wherein said cuplike portions and said column members are arranged so as to allow four-way insertion of lifting members into the space between the upper and lower deck members.

10. A load-bearing pallet comprising
a. spaced-apart top and bottom deck members, said deck members each comprising a blow-molded, thermoplastic unitary structure defining an enclosure having upper and lower generally parallel surfaces, each of said surfaces having a plurality of parallel recessed channels,
b. a plurality of cuplike portions on said top deck member and on said bottom deck member, said cuplike portions being located on the facing surfaces of said top and bottom deck members with the cuplike portions on the top deck member being axially aligned and in registry with the cuplike portions on the bottom deck member, and c. a plurality of tubular column members, each of said column members having opposite end portions secured to said respective axially aligned cuplike portions on said top and bottom deck members respectively.